(12) United States Patent
Harel et al.

(10) Patent No.: US 8,184,142 B2
(45) Date of Patent: May 22, 2012

(54) METHOD AND SYSTEM FOR COMPOSING VIDEO IMAGES FROM A PLURALITY OF ENDPOINTS

(75) Inventors: Erez Harel, Rishon le Zion (IL); Anat Bzoza, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 517 days.

(21) Appl. No.: 12/492,797

(22) Filed: Jun. 26, 2009

(65) Prior Publication Data
US 2010/0328422 A1 Dec. 30, 2010

(51) Int. Cl.
H04M 11/00 (2006.01)

(52) U.S. Cl. ..................... 348/14.01; 370/261

(58) Field of Classification Search .... 348/14.01–14.09, 348/14.12, 14.13; 379/202, 552; 370/263, 370/270, 402, 465, 477, 498, 535, 545, 259, 370/260, 261, 265, 400, 401, 420, 463; 709/201
See application file for complete search history.

(56) References Cited

U.S. PATENT DOCUMENTS

| | | | | |
|---|---|---|---|---|
| 5,838,664 A * | 11/1998 | Polomski | | 370/263 |
| 6,496,216 B2 * | 12/2002 | Feder et al. | | 348/14.09 |
| 7,675,872 B2 * | 3/2010 | Zhu | | 379/93.09 |
| 2004/0199565 A1 * | 10/2004 | Visharam et al. | | 709/201 |
| 2006/0114844 A1 * | 6/2006 | Zhu | | 370/260 |
| 2006/0146734 A1 * | 7/2006 | Wenger et al. | | 370/260 |
| 2006/0146934 A1 * | 7/2006 | Caglar et al. | | 375/240.12 |
| 2007/0263087 A1 * | 11/2007 | Hong et al. | | 348/14.13 |

* cited by examiner

Primary Examiner — Curtis Kuntz
Assistant Examiner — Maria El-Zoobi
(74) Attorney, Agent, or Firm — Wong, Cabello, Lutsch, Rutherford & Brucculeri, LLP

(57) ABSTRACT

The present application discloses a method and apparatus for a multipoint video conferencing system that can offer a wide variety of layouts and the ability to support a large number of conferees. A received stream of NALs from a plurality of endpoints can be processed by an exemplary NAL Processor Module (NPM) and be arranged into a stream of NALs that are referred to in this disclosure as organized NALs (ONALs). Two or more streams of compressed video organized into ONALs can be received by an exemplary NAL Editor Module (NEM), wherein each stream was created from a video image that was generated at an endpoint participating in the conference. An exemplary NEM can comprise a compressed composed frame memory (CCFM) module. Each CCFM can be divided into segments according to the layout of the continuous presence (CP) image that is to be displayed by one or more receiving endpoints.

17 Claims, 9 Drawing Sheets

METHOD AND SYSTEM FOR COMPOSING VIDEO IMAGES FROM A PLURALITY OF ENDPOINTS

FIELD OF THE INVENTION

The present invention relates to video communication and more particularly to a method and an apparatus for composing compressed video from more than one video source into video image of a conference.

BACKGROUND

As the traffic over Internet Protocol (IP) networks continues its rapid growth, and as the variety of video conferencing equipment used over IP networks continues to increase, more and more people are using video conferencing over IP networks as their communication tool of choice. A common multipoint conference between three or more participants uses a multipoint control unit (MCU). An MCU is a conference-controlling entity that typically is located in a node of a network or in a terminal which receives several channels from endpoints and, according to certain criteria, processes audio-visual signals and distributes them to a set of connected channels. Examples of MCUs include the MGC-100 and the RMX 2000, which are available from Polycom Inc. A terminal (which may also be referred to as an endpoint) is an entity on the network, capable of providing real-time, two-way audio and/or visual communication with other terminals or with the MCU. More thorough definitions of terminal and MCU can be found in the International Telecommunication Union ("ITU") standards, for example, the H.320, H.324, and H.323 standards.

A common MCU may include a plurality of decoders, encoders, and bridges. The MCU may use a large amount of processing power to handle video communications between a variable number of participants, using a variety of communication and compression standards for the variety of input bit streams received from the different endpoints. The MCU may need to compose these input streams into at least one single output stream that is compatible with the requirements of at least one conferee to which the output stream is being sent.

A conference may have one or more video output streams. Each output stream is associated with a layout. A layout defines the appearance of a conference on a screen (display) of one or more conferees that receive the stream. A layout may be divided into one or more segments. Each segment may be associated with the video input stream that is sent by a certain conferee. Each output stream may be constructed of several input streams. Such a conference may be called a "continuous presence," or CP, conference. In a CP conference, a user at a remote terminal can simultaneously observe several other participants in the conference. Each participant may be displayed in a different segment of the layout. The segments may be of the same size or of different sizes. The choice of the participants that are associated with the segments of the layout may be varied among different conferees.

A common MCU may: decode each input stream into uncompressed video of a full frame; manage the plurality of uncompressed video streams that are associated with the conferences; and compose and/or manage a plurality of output streams, in which each output stream may be associated with a conferee or a certain layout. The output stream may be generated by a video output port associated with the MCU. An exemplary video output port may comprise a layout builder and an encoder. The layout builder may collect and scale the different uncompressed video frames from selected conferees into their final size and place them into their segment in the layout. Then, the video of the composed video frame is encoded by the encoder. Consequently processing and managing a plurality of videoconferences requires heavy and expensive computational resources. Therefore, an MCU is typically an expensive and rather complex product. Common MCUs are disclosed in several patents and patent applications, for example, U.S. Pat. Nos. 6,300,973, 6,496,216, 5,600,646, or 5,838,664, the contents of which are incorporated herein by reference. These patents disclose the operation of a video unit in an MCU that may be used to generate the video output stream for a CP conference.

The growing trend of using video conferencing over IP networks raises the need for low cost MCUs that will be able to conduct a plurality of conferencing sessions as well as compose CP video images. However, low cost MCUs may only be able to handle a limited number of multipoint conferences (e.g., a limited number of conferees, a limited number of layouts, a limited number of communication standards, etc.).

There are existing techniques that compose compressed video streams into a compressed video stream of CP video images with fewer resources than a common MCU. Some of them disclose an image processing apparatus for composing a plurality of Quarter Common Intermediate Format (QCIF) coded images into one CIF image without decoding the plurality of coded images when the images are transmitted using the H.261 standard. QCIF is a videoconferencing format that specifies a video frame containing 144 rows and 176 pixels per row, which is one-fourth of the resolution of Common Intermediate Format (CIF). QCIF support is required by some of the International Telecommunications Union (ITU) videoconferencing standards. However, such prior art methods can not be implemented in sessions which use modern compression standards such as H.264.

Other techniques to overcome the size and layout limitations listed above use what is known as a sub-encoding method. An exemplary sub-encoding method is disclosed in U.S. Pat. No. 7,139,015, the contents of which are incorporated herein by reference. However, sub-encoding systems require the use of resources such as video decoders and encoders.

Thus, existing methods and apparatuses offer limited functionalities. For example, the segment size of each one of the conferees in the layout is the same size as his input stream. In the case of mixing QCIF images into a CIF image, the layout of the output frame is limited to a maximum of four conferees, and the frame portion that is associated with each one of the conferees is a quarter of the output frame.

Therefore, there is a need for a method and apparatus that can offer a wide variety of layouts and the ability to support a large number of conferees. In order to comply with the increasing use video conferencing over IP networks, the new method and apparatus will need to be able to manipulate video compression standards that are popular in IP video communication.

SUMMARY

The above-described needs are met using a novel method and novel apparatus/system for mixing a plurality of compressed input video streams into one or more composed video output streams of CP layouts of a conference. An exemplary embodiment of the present invention composes one or more CP images in the compressed domain by utilizing video resources, e.g., an encoder/decoder, that exist at the endpoint.

An exemplary embodiment of the present invention may receive a stream of packets from each one of the conference's endpoints. The payload of each packet can comprise compressed video that was compressed according to an ITU compression standard, for example, H.264. A common stream of compressed video according to H.264 comprises a stream of data chunks. Each data chunk can comprise two layers, a Video Coding Layer (VCL) and a Network Abstraction Layer (NAL), also known as a Network Adaptation Layer. The VCL represents the video content, and the NAL formats the VCL representation of the video and provides header information in a manner appropriate for conveyance by particular transport layers. Each data chunk can be referred as a NAL unit. Each NAL unit can comprise an integer number of bytes of video data (found in the VCL layer) and a header. The NAL header can include spatial, time, and frame information. Exemplary information can be a frame number of the frame that includes the NAL unit in the stream of NAL units, information on the place (location) of the video data in the video image frame (by using the macro block address (MBA) of the first MB in the NAL unit, for example), etc. More information about the H.264 compression standard can be found at www.itu.int.

The payload of a NAL unit 101 can comprise compressed video data from one or more rows of macro blocks 103 (MBs), as illustrated in FIG. 1a. A packet that carries video data can include one or more NAL unit. FIG. 1a illustrates a frame memory (FM) snapshot 100 in which a macro block's 103 location in memory is reflected in the displayed frame (row and column) on the screen, and the content represents compressed video data that is related to the relevant MB. The compressed data can include coefficients, motion vectors (MV), prediction parameters, etc. In some embodiments of the present invention, each location in the FM 100 which is relevant to a particular MB can also store variety of other information related to that MB. For example, information such as: the frame number to which the MB data that are carried by the NAL unit belong; a start of NAL unit indication (SONI), which can be used for defining the boundaries of the end of a NAL unit while processing received NAL units; or the number of MBs in the NAL unit. Additionally, an FM module can employ two or more FMs, for example, the currently displayed FM and next FM. The plurality of FMs' alternately store and output compressed video of consecutive frames.

An exemplary embodiment of the present invention may comprise one or more NAL processor modules (NPM) and one or more NAL editor modules (NEM). Each of the endpoints that participates in a conference session with a CP layout can be instructed to deliver video images in a size that matches their allocated segment size. The size of a video image can be defined by number of pixels in the width and height of the frame (W×H). In some embodiments, an endpoint can be instructed to deliver more than one size. In other embodiments, an endpoint can be instructed to avoid using motion vectors that are outside of the picture boundary. In further embodiments, an endpoint can be instructed to perform only a limited number of types of Intra-MB prediction. Intra-MB refers to an MB that was compressed relative only to information that is contained within the current frame.

The image can be compressed at the endpoint according to H.264 compression standard, organized in NAL units, and then transmitted toward a NPM. Each NAL unit in the stream can include information from one or more rows 104 of compressed MBs 103, as is illustrated in FIG. 1a. Consequently, there are some rows 104 in which the video data at the start of the row (SOR) is located inside a NAL unit 101. For example, the beginning of the second row is located inside NAL unit a1, the beginning of the third row is located inside NAL unit a2, and so on. The letter in the identifier of each NAL unit represents the endpoint (endpoint 'a,' for example) that the NAL unit was sent from, and the number represents the order of the NAL unit in the stream received from the endpoint.

A received stream of NAL units from an endpoint can be processed by an exemplary NPM and be arranged into a stream of NAL units that are referred to in this disclosure as Organized NAL units (ONALs) 111, wherein a new ONAL 111 is initiated for the compressed data of each SOR of each row of MBs and each ONAL comprises compressed data of one or more MB that resides in the same row, as is illustrated in FIG. 1b. Consequently, each ONAL comprises compressed data that belongs to one row of MBs or a portion of one row of MBs.

FIG. 1b illustrates the exemplary frame memory 110 of FIG. 1a after organizing the stored MBs into ONALs. Henceforth, the description, drawings and claims of the present application may use the term ONAL as a representative term for a stream of organized NALs. The ONAL format is similar to the common NAL unit format known in the art, and can be treated as a common NAL unit with the common standards. An ONAL's header and data are also similar to the common NAL units. The ONALs may comply with the same standard as the common NAL units An ONAL can comprise up to an entire row of MBs, such as ONAL a11 and ONAL a22. Alternately, a row can be carried by two or more ONALs, such as the second row in FIG. 1b, which is carried as the payload of ONALs a12 and ONAL a21, or the fourth row, which is carried by ONAL a23 and ONAL a31. As discussed above, the letter in the identifier of each ONAL represents the endpoint (endpoint 'a,' for example), and the first number in the identifier represents the order of the NAL unit in the stream received from the endpoint NAL unit. The second number in the identifier represents the serial number of the ONAL created from the received NAL unit. Therefore, ONAL a31 represents the first ONAL that was created from the third NAL unit which was received from endpoint 'a,' for example.

An exemplary NAL unit processor can parse each received NAL unit from a received stream of NAL units. Based on information that is embedded within the header of a received NAL unit, the NPM determines the location of the first MB of the received NAL unit by row and column number in the allocated frame memory. After determining the location of the first MB, the content of the compressed video that is related to the first MB can be retrieved from the payload of the NAL unit and can be stored at a determined location. The NPM can then proceed along the payload of the NAL unit and store, consecutively, the compressed data of the rest of the MBs that are carried by the received NAL unit. When the end of a row is reached, the NPM can step down one row in the FM and continue the process of retrieving MB's data and storing it in the FM until reaching the end of the NAL unit. The process can then continue with the next consecutive received NAL unit until processing the last NAL unit in the received frame.

An exemplary NPM can proceed and process the information that is stored in the NAL unit frame memory in order to convert the received NAL units into ONALs that are then stored in ONAL frame memory 110, as is illustrated in FIG. 1b. Each ONAL contains information from a single row of MBs and a single received NAL unit. A new ONAL can be created each time the end of a row of MBs is reached in the middle of a received NAL unit (as is shown in FIG. 1a at the end of the first row of NAL unit a1) or if the end of a received NAL unit is reached in the middle of a row of MBs (as is shown in FIG. 1a at the end of NAL unit a1, which occurs in the middle of the second row of MBs).

Parameters of the NAL unit header are then manipulated in order to comply with the new stream of ONALs. For example, a Start of NAL unit indication is added to indicate the starting point of the newly-created ONAL; the header field storing the address of the first MB in the NAL unit is updated to point to the first MB in the newly-created ONAL, etc.

In addition to manipulating the parameters in the NAL unit header of an ONAL, the compressed content, which is stored in the received FM 100 (FIG. 1a), is manipulated in order to compensate for the results that a receiving decoder will get due to the new arrangement of the ONALs in the FM 110 (FIG. 1b). Compression parameters are then manipulated in order to compensate for the new arrangement. The residual MV data can then be adapted to reflect the new arrangement if necessary. After converting the NAL units received from each endpoint into ONALs, the ONALs are transferred to an exemplary NEM to be composed into a frame of a CP image.

In another exemplary embodiment, the NPM may start converting a received NAL unit into one or more ONALs upon receiving the entire NAL unit without waiting to receive the entire relevant frame.

In a further embodiment, an endpoint can be instructed to organize its generated compressed video into ONALs, placing each SOR of the compressed video at the beginning of a NAL unit. In such an embodiment, an NPM is not needed since the endpoint itself sends a stream of ONALs of compressed video.

In a further embodiment, an NPM can be associated with an endpoint; i.e., it can be embedded within the endpoint between the encoder and the network, for example.

Two or more streams of compressed video organized into ONALs can be received by an exemplary NEM, wherein each stream was created from a video image that was generated at an endpoint participating in the conference. An exemplary NEM can comprise a compressed composed frame memory (CCFM) module. An exemplary CCFM module stores compressed video associated with one or more video frames. The CCFM module can employ two or more CCFMs, e.g., the currently displayed CCFM and the next CCFM. The memory module alternately stores and outputs compressed video of consecutive frames.

Each CCFM can be divided into segments according to the layout of the CP image that is to be displayed by one or more receiving endpoints which are the destinations of the relevant CP image. Each segment in the CCFM can reflect the properties of the segment (e.g., size and location) in which a received stream of compressed video will be displayed. For each received stream of ONALs, the ONALs are individually parsed. Based on information retrieved from the ONAL header, such as frame number and location information (i.e., the first MB of the ONAL), the VCL data of each MB of the ONAL is stored in the appropriate location (order) in the relevant segment in the CCFM according to the layout of the relevant CP image that is stored in the CCFM. In addition, an indication of the beginning of a NAL unit is also stored in the CCFM in the location of the first MB in the NAL. Storing the information in a segment can be similar to the storing process of received NAL units as it is disclosed above in conjunction with FIG. 1a, but in the boundaries of the relevant segment in the CCFM according to the required layout.

FIG. 1c illustrates a snapshot of a CCFM 120 after storing the compressed video data of each ONAL of six received streams, e.g., the stream from endpoint 'd' 122. MBs of each ONAL in each stream are stored in their appropriate location in the CCFM 120.

After placing the data of the streams in place, an exemplary NEM may initiate a Deblocking-Filtering Preventing Mechanism (DFPM). Deblocking-filtering is a filter that is implemented by a video decoder at a receiving endpoint in order to reduce the effect of dividing the image into blocks of pixels. For each edge between two blocks, a decision is made by the video decoder whether or not to implement the deblocking-filtering mechanism on a block which is on the right side (or the bottom side) of the relevant edge. The decision can be based on several parameters. One of the parameters is the intensity of the changes inside each of the blocks on both sides of the relevant edge—left and right, or up and down. If the change inside the block close to the relevant edge is higher than a certain threshold value, $\beta$, then the deblocking filter is disabled. $\beta$ reflects real changes in the image—not artificial data—therefore there is no need to filter. Values of $\beta$ can be varied from zero to $\beta_{max}$, wherein $\beta_{max}$ is a small number, e.g., less than 20.

Utilizing this attribute of the deblocking filter, an exemplary DFPM can add artificial data to the compressed composed image. Exemplary artificial data can include lines that create borders between the various segments. The width of a so-called "border line" can be an integer number of MBs. In the exemplary CCFM 130 of FIG. 1d, the border lines 131 are indicated by the dotted areas. A border line 131 can be uniform, having values that will lead the video decoder of the receiving endpoint to prevent implementing the deblocking filter on both sides of the edges of the borderlines. An exemplary border line 131 can have a width of a MB. The value of each one of the three colors components (Y, Cb, and Cr) of each pixel inside the borderline MB and in its four corners can be zero. The rest of the pixels along the four edges of the MB can have a value that is bigger than $\beta_{max}$, e.g., greater than 50.

In another exemplary embodiment, the Deblocking-Filtering can be turned off. Turning off the deblocking filter can be implemented by instructing the endpoints that participate in the conference session to disable the Deblocking-Filtering mechanism.

At an appropriate time, an exemplary NEM may start retrieving the ONALs from the CCFM 130. The order that ONALs are fetched in can be one row of MBs of the CP image after the other—from the top of the image to the bottom of the image, for example. The MBs that make up each ONAL, in the same row of FM 130, are likewise retrieved one after the other, for example, from left to right. FIG. 1d illustrates the order in which ONALs that are stored in the exemplary snapshot of the CCFM 130 are retrieved. The NAL unit header of each retrieved ONAL is manipulated to indicate the appropriate frame number in the stream of the compressed CP frames. Other parameters in the NAL unit header can be manipulated as well, for example, the MBA of the first MB in the NAL unit, to reflect its location in the CP image. The compressed composed image can then be sent toward the one or more receiving EPs. In one exemplary embodiment, the appropriate time to begin fetching ONALS from a CCFM can be when the CCFM is completed. In an alternate embodiment, the appropriate time can be when several consecutive rows of ONALs are completely stored in the CCFM. In the latter embodiment, latency can be reduced. The time interval between transmitting two consecutive CCFMs can be similar to the frame rate that was defined during establishment of the connection with the one or more other endpoints, which can be the destination of the composed video.

In another exemplary embodiment of the present invention, the NPM can be configured to manipulate a received NAL unit into an ONAL upon receiving the relevant NAL unit—without waiting for the completion of the entire frame. In such an embodiment, the latency of the system can be improved.

In another alternate embodiment of the present invention, the NPM can be configured to create the ONAL according to the final position of the relevant segment in the layout and store the compressed video of its MBs in CCFM 120 (such as is illustrated in FIG. 1c) instead of using the frame memory 110 of FIG. 1b. Such an embodiment can save resources, computing time, and latency. However, for simplicity of the description and the teaching, the below detailed description describes an embodiment in which one frame memory is used for each stage.

An exemplary embodiment of the present invention can use a centralized architecture. In a centralized architecture, one or more NPMs and one or more NEMs are included within an MCU, for example. Each EP can send one or more streams of common NAL units, wherein each stream is in an appropriate size. The streams of the common NAL units comply with H.264 compression standard toward the MCU. In the MCU, the NPMs and the NEMs process the received compressed video and deliver compressed CP video images in H.264, wherein the NAL units are ONALs, and each ONAL carries data from a single row of MBs.

Another embodiment may use a decentralized architecture. In a decentralized architecture, each endpoint can comprise a NPM and a NEM. Each endpoint can be instructed to transmit one or more streams of compressed video in an appropriate size and arranged into ONALs towards one or more other endpoints. The NEM at the other endpoints collects a plurality of ONAL streams from transmitting endpoints, creates a compressed CP, and then decodes it to be presented. In such an embodiment, an MCU may be used as a managing unit.

Yet another exemplary embodiment of the present invention may use a hybrid architecture, in which an MCU may comprise one type of module, e.g., NPM or NEM, and the endpoints may comprise the other type of module, i.e., NEM or NPM, respectively. In such an embodiment, the MCU also manages the session. Yet other embodiments may comprise a combination of the above architectures.

Embodiments of the present disclosure require fewer video processing resources to compose a CP image. Fewer resources are needed by the disclosed embodiments to fully decode a plurality of video images received from a plurality of endpoints, scale the decoded video, compose the scaled decoded image into a CP image and fully encode the CP video image compared to the resources needed by a common MCU.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

DETAILED DESCRIPTION

Figure 1A:
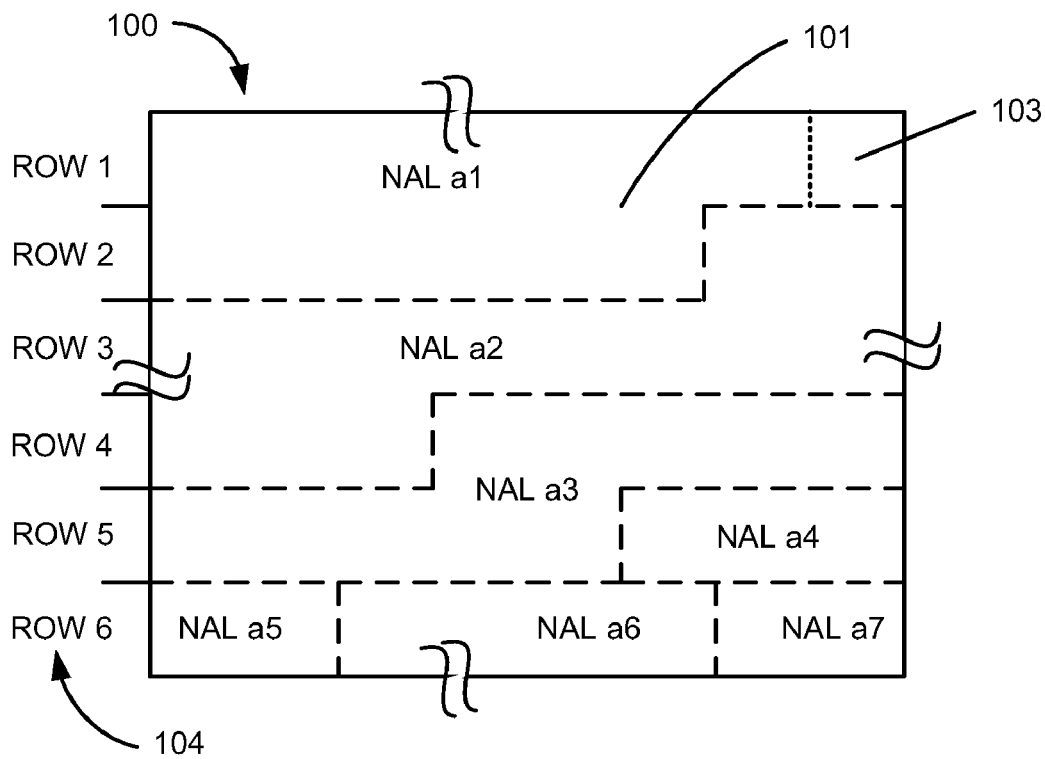
FIG. 1a is an illustration of an exemplary frame memory (FM) snapshot received from an endpoint.

Table 1 lists abbreviations used throughout the Disclosure.

TABLE 1

| Abbreviations used throughout the Disclosure | | | |
|---|---|---|---|
| CP | Continuous Presence | CCFM | Compressed Composed Frame Memory |
| NAL | Network Abstraction Layer | DFPM | Deblocking Filtering Preventing Mechanism |
| VCL | Video Coding Layer | | |
| MB | Macro Block | EP | End Point |
| MBA | Macro Block Address | MCU | Multipoint Control Unit |
| FM | Frame Memory | NI | Network Iterface Module |
| MV | Motion Vector | ONAL | Organized NAL units |
| NPM | NAL Processor Module | EPFM | End Point Frame Memory |
| NEM | NAL Editor Module | CVDI | Compressed Video Data Interface |
| SOR | Start of Row | | |
| SCVPM | Session Compressed Video Processing Module | SONI | Start of NAL unit Indication |
| | | MBaccu | MB accumulator |

Turning now to the figures, exemplary embodiments, aspects, and features of the disclosed methods, systems, and apparatuses are described. For convenience, only some elements of the same group may be labeled with numerals. The purpose of the drawings is to describe exemplary embodiments and should not be viewed as limiting in any way.

As discussed above, FIG. 1a is an illustration of an exemplary frame memory (FM) snapshot 100 received from an endpoint. In a frame memory 100, the location of the data reflects a location of a macro block 103 (MB) in the frame (row and column), and the content reflects compressed video data that is related to the relevant MB. The compressed data can include coefficients, motion vectors, prediction parameters, etc. A payload of a NAL unit 101 can comprise compressed video data from one or more rows 104 of MBs.

Figure 1B:
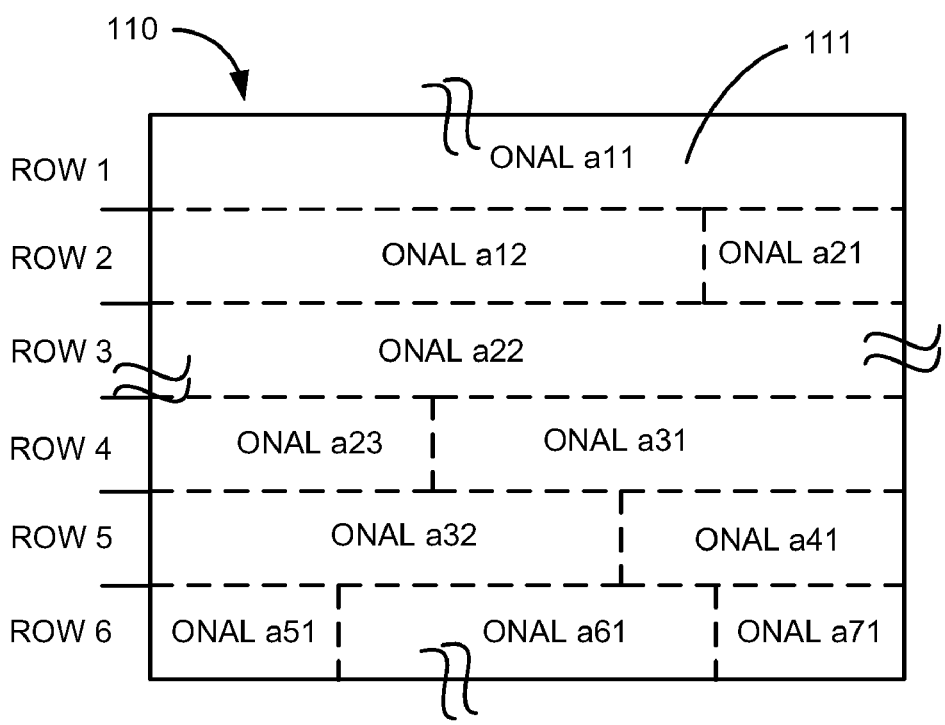
FIG. 1b is an illustration of an exemplary frame memory (FM) snapshot created by a NAL unit processor module (NPM), for example. The frame comprises ONALs (organized NAL units).

FIG. 1b is an illustration of the exemplary frame memory 110 of FIG. 1a after the stored MBs were organized and aligned into ONALs (organized NAL units). The organizing can be done by a NAL unit processor module (NPM). FIG. 1b can be an intermediate stage in an NPM process. Each row 104 in FIG. 1b begins with a new ONAL 111. Each ONAL can comprise up to an entire row of MBs, for example, ONAL a11 and ONAL a22. Alternatively, a row can comprise two or more ONALs, such as the second row in FIG. 1b, which is comprised of ONAL a12 and ONAL a21. The letter in the identifier of each ONAL represents the endpoint (endpoint 'a,' for example), and the first number represents the order of the NAL unit in the received stream from the endpoint. The second number represents the serial number of the ONAL created from the received NAL unit. Therefore, ONAL a31, for example, represents the first ONAL that was created from the third NAL unit which was received from EP 'a.'

The relevant parameters of each ONAL header can be modified, for example, the frame number or the First MB in the ONAL. The data in the ONALs, such as, but not limited to, the prediction parameters, can also be modified. One exemplary prediction parameter is whether or not the motion vectors will be affected by the new arrangement of the NAL units. In another exemplary embodiment of the present invention, the NPM may start converting a received NAL unit into one or more ONALs immediately upon receiving the entire NAL unit without waiting to receive the entire relevant frame.

Figure 1C:
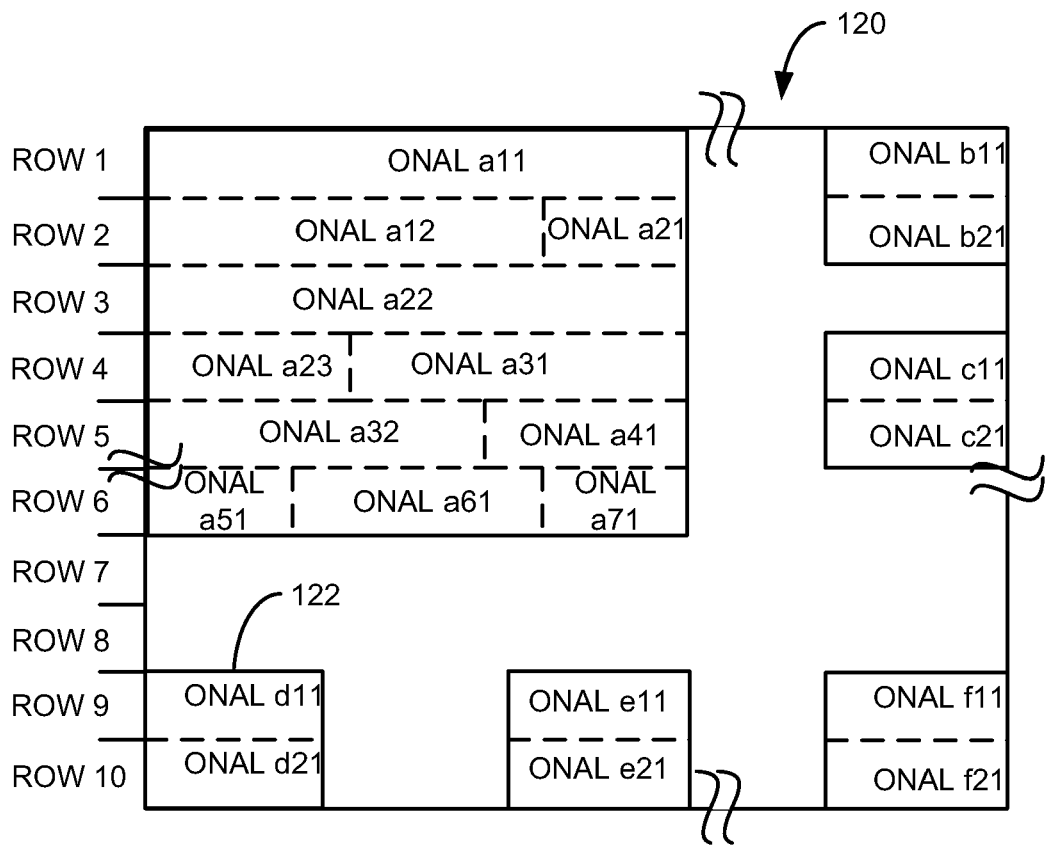
FIG. 1c is an illustration of an exemplary snapshot of a compressed composed frame memory (CCFM).

FIG. 1c is an illustration of an exemplary snapshot of a compressed composed frame memory (CCFM) 120 composed by a NAL unit editor module (NEM) and associated with a CCFM module. The CCFM 120 can be composed of the six received endpoint streams, in the ONAL arrangement, for example. Each location in the CCFM reflects a specific location in a frame of a composed image (in units of MBs). Each segment in the CCFM is relevant to a certain endpoint. For example, segment 122 is relevant to endpoint 'd.' The size of the segment is the same as the requested size from the endpoint. The segment size can be measured by number of pixels, blocks, or MBs in each direction—usually reported in width-by-height format (W×H). The CCFM module can employ two or more FMs (for example, the currently displayed CCFM and next CCFM to be displayed). The CCFMs alternately store and output compressed video of consecutive frames. There can be more than one CCFM that is fully stored and waiting to be output. In a mapping process of the exemplary CCFM, the segment for each endpoint is defined by the address of the top left MB of the segment and the bottom right MB of the segment in the composed image.

In an exemplary embodiment shown in FIG. 1c, the CCFM 120 is composed of six ONAL FMs (one for each conferee), similar to what is illustrated in FIG. 1b. During the process, the relevant parameters in the ONAL headers can be modified. In an alternate embodiment, the process of composing the CCFM 120 of FIG. 1c can include the creation of the ONALs in a process similar to the one described above in conjunction with FIG. 1b.

Figure 1D:
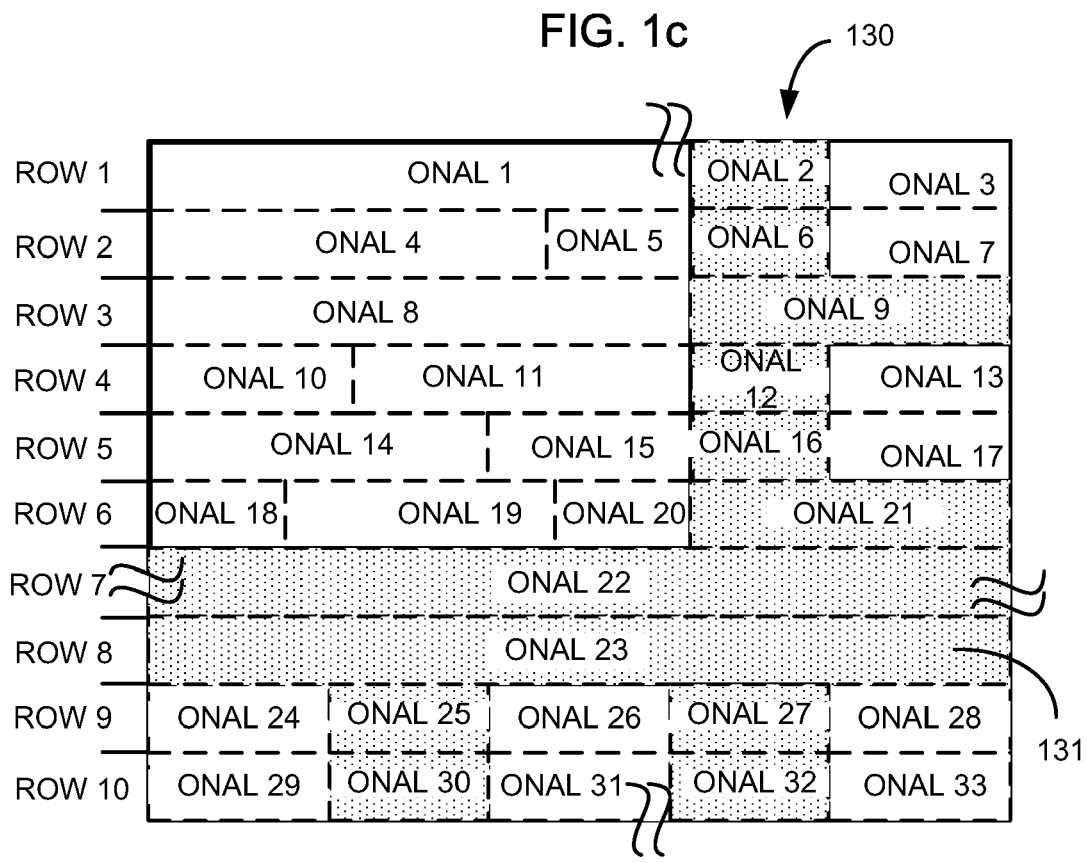
FIG. 1d is an illustration of an exemplary snapshot of a compressed composed frame memory after using an exemplary Deblocking-Filtering Preventing Mechanism (DFPM).

FIG. 1d is an illustration of an exemplary snapshot of a CCFM 130 after implementing a preventive deblocking filter mechanism for preventing filter errors due to the different images (i.e., segments). An exemplary mechanism adds so-called "border lines" 131 between the segments. The NAL units in FIG. 1d are organized NAL units (ONALs). The CCFM 130 of FIG. 1d can be composed by a NAL unit editor module (NEM). Border line ONALs 131 are added in the CCFM in order to prevent the deblocking filter errors. The border line ONALs' data can be one or more integer number of MBs in width. The color of the border line can be uniform, wherein the three color components (Y, Cb, and Cr) of the pixels inside and at the four corners of each MB of the border line can have a color value of zero, while the rest of the pixels along the edges of the MB can have values greater than a $\beta_{max}$ of, for example, 50, as is disclosed above in the Summary section.

In another exemplary embodiment, the Deblocking-Filtering can be turned off. Turning off the deblocking filter can be implemented by instructing the endpoints that participate in the conference session to disable the Deblocking-Filtering mechanism.

In addition, parameters such as frame number and location of the first MB in the NAL can also be added. The border line ONALs 131 can be added during the mapping of the CCFM. In an alternate embodiment, the borderlines ONALs 131 can be added after or before the segments of the CCFM have been entered and modified. In another embodiment of the present invention, converting received NAL units into ONALs can be executed simultaneously with filling the CCFM 130 of FIG. 1d, thus reducing latency time.

Figure 2:
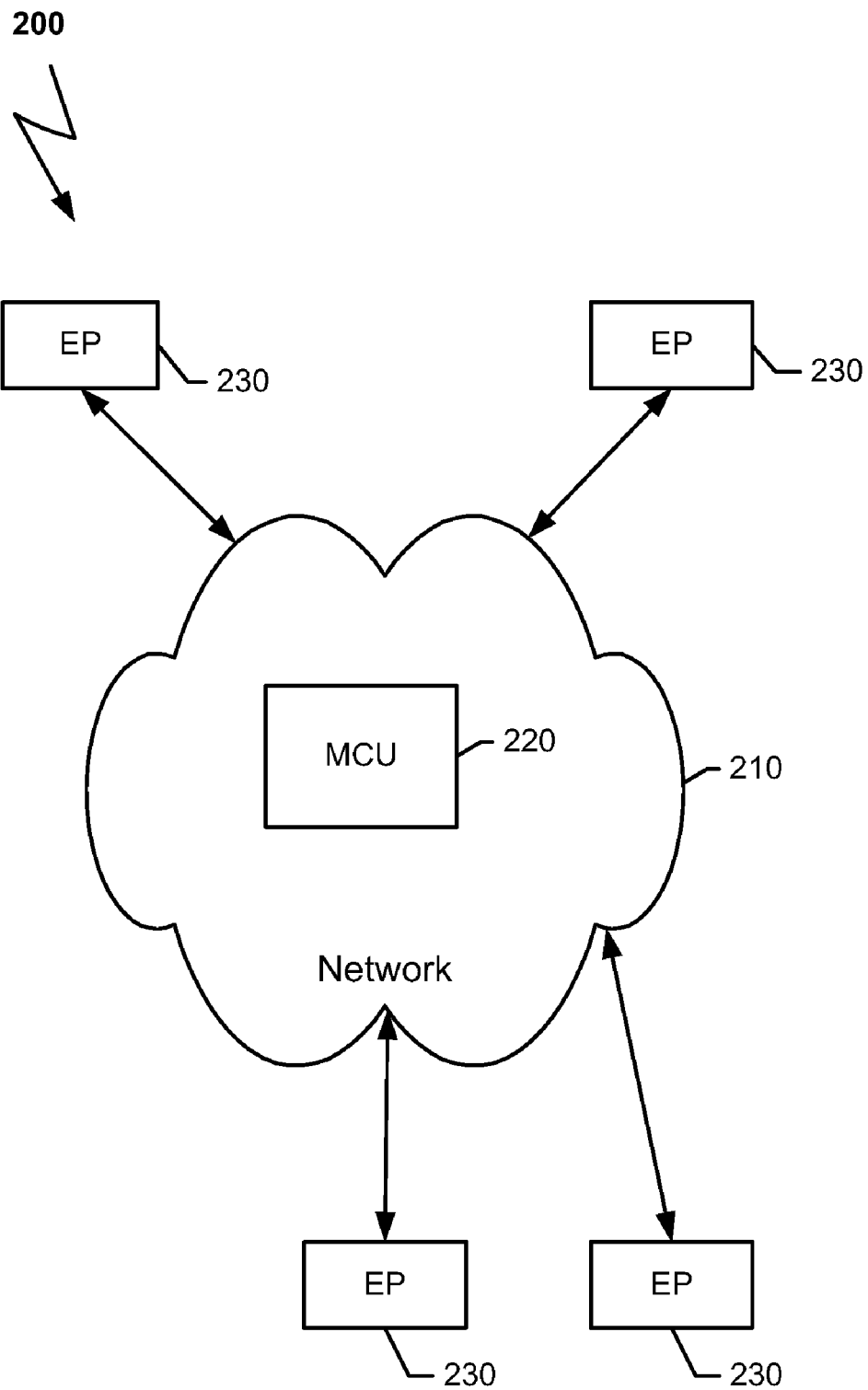
FIG. 2 is a block diagram illustrating an exemplary portion of a multimedia multipoint conferencing system in which an exemplary embodiment of the present invention can be implemented.

FIG. 2 is a block diagram illustrating an exemplary portion of a multimedia multipoint conferencing system 200, in which an exemplary embodiment of the present invention can be used. System 200 can comprise a network 210 and a plurality of endpoints 230. An endpoint (which may also be referred to as a "terminal") is an entity on the network, capable of providing real-time, two-way audio and/or visual communication with other endpoints or with a MCU. Network 210 may comprise one or more MCU 220. An exemplary MCU can be a common MCU as the one that is described above, which has been modified to implement the teachings of the present description. Alternatively an exemplary MCU 220 can be a network device such as, but not limited to an application server working on IP network. MCU 220 is only one of many different network devices/application servers that can implement the teachings of the present description. Therefore, the present invention should not be limited to the use of MCUs only.

Network 210 can be, but is not limited to, a packet switched network, a circuit switched network, or any combination of the two. The multimedia communication over the network can be based on communication protocol such as, but not limited to, H.320, H.324, H.323, and SIP, and it may use compression standards such as, but not limited to, H.264. It will be appreciated by those skilled in the art that, depending upon its configuration and the needs of the system, each system 200 can have other number of endpoints 230, networks 210, and MCUs 220. However, for purposes of simplicity of understanding, four endpoints 230 and one network with one MCU 220 are shown.

Figure 3:
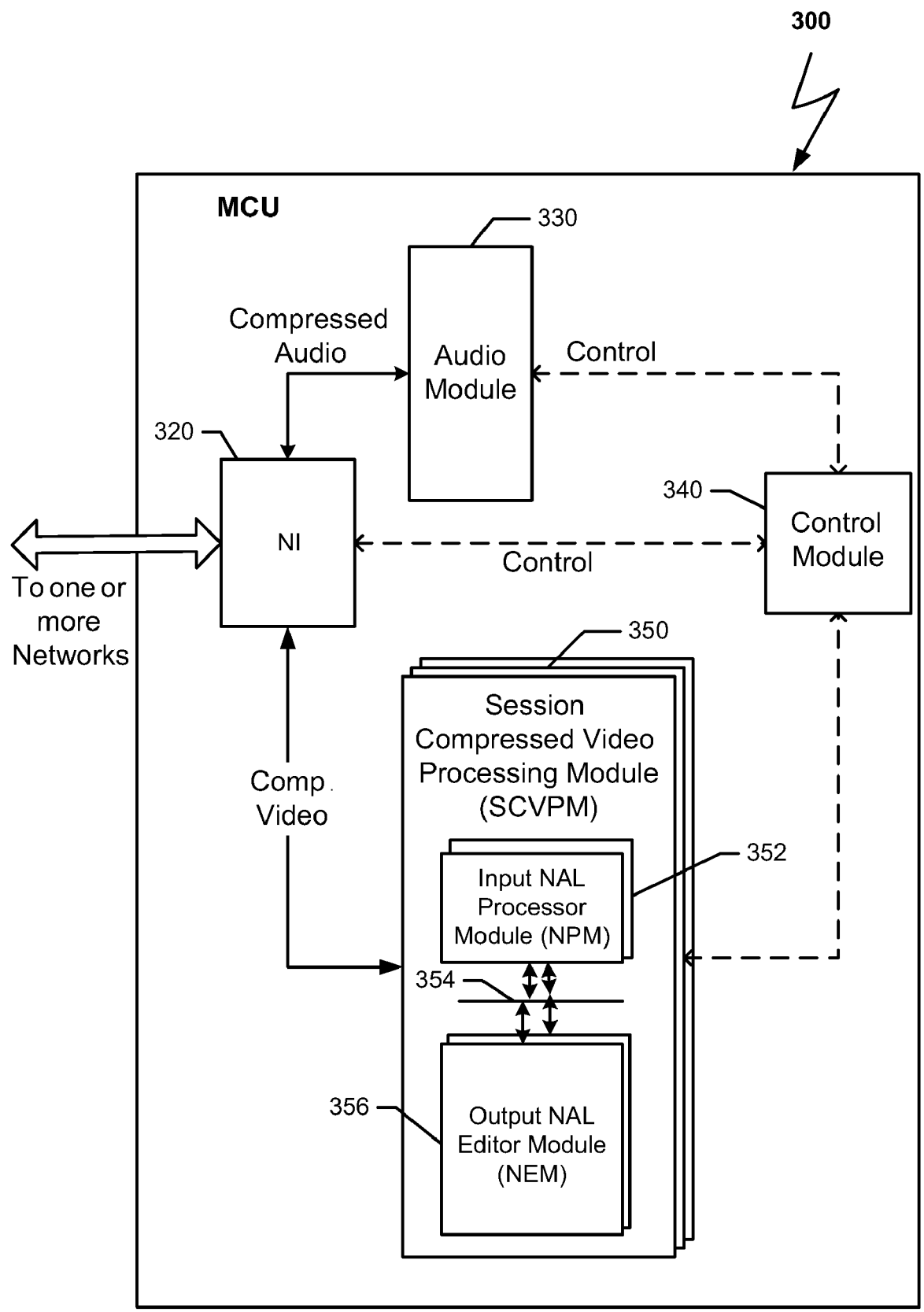
FIG. 3 is a simplified block diagram with relevant elements of an exemplary MCU.

FIG. 3 illustrates relevant elements of an exemplary MCU 300, which is capable of implementing techniques and elements of the present invention. MCU 300 may include a network interface module 320 (NI), an audio module 330, a control module 340 and a session compressed video processing module (SCVPM) 350. The SCVPM 350 can comprise a plurality of input NAL unit processor modules (NPM) 352, a plurality of output NAL unit editor modules (NEM) 356, and a compressed video data interface 354. The compressed video data interface 354 may be one of a variety of interfaces, such as but not limited to: shared memory, ATM bus, TDM bus, PCI bus, or a direct connection.

The network interface module 320 (NI) communicates with a plurality of endpoints 230 (See FIG. 2) via networks 210 (See FIG. 2). NI 320 processes the communication according to one or more variety of communication standards such as, but not limited to, H.320, H.323, or SIP. NI 320 can receive and transmit control and data information to and from other MCUs and endpoints. More information concerning the communication between the endpoint and the MCU over network 210 and information describing signaling, control, compression, and establishing of a video call can be found in the international telecommunication union (ITU) standards, such as H.320, H.321, H.323, etc. The exemplary NI 320 may process the received communication from the physical layer, data link layer, network layer and the transport layer, and vice versa. NI 320 can multiplex or demultiplex the different streams and controls transferred between the different modules in the MCU 300 and the EP 230 (See FIG. 2). An exemplary NI 320 may organize received NAL units according to their frame number, which is embedded within the header of the transport layer.

The compressed audio signal is transferred between the audio module 330 and the NI 320. The compressed video signal is transferred between the NI 320 and SCVPM 350. The control and signaling is transferred between the control module 340 and the different modules in MCU 300.

Audio module 330 may receive compressed audio streams from the endpoints 230 (See FIG. 2) via NI 320. The audio module 330 can decode the compressed audio streams, analyzes the decoded streams, selects certain streams and mix the selected streams. Then the mixed stream can be compressed and the compressed audio mixed stream can be sent via the compressed audio link back to network interface 320, which sends the compressed audio streams to the different endpoints 230. Audio streams that are sent to different endpoints can differ from each other. For example, the audio stream can be formatted according to the different communication standard and according to the needs of the individual endpoint. Also, audio streams may not include the voice of the particular user associated with the endpoint to which the audio stream is sent—even though that voice is included in all other audio streams.

Audio module 330 can be adapted to analyze the received audio signals from the endpoints and determine the audio signal energy of each endpoint. Information on the signal energy can be transferred to the control module 340. The energy level can be used to determine which endpoint is a "selected endpoint" or a "presented endpoint," i.e., which endpoint is the speaking endpoint. In such an embodiment, the audio module 330 can point the control module 340 on one of the conferees as the speaker, as well as the other presented conferees.

Another task of the audio module 330 can be to implement a "click and view" option. In such an embodiment, a Dual-tone multi-frequency (DTMF) signal can be used to carry conferees' selections to the MCU, e.g., the user is asked to press the number '1' on his phone to select a certain option. Audio module 330 can be capable of decoding the DTMF signals, which are embedded within the audio signal of the conferee. The user's selection can be transferred over the control connection to the control module 340.

Control module 340 can be a logical unit that controls the operation of the MCU 300. In addition to common operation of a typical MCU, MCU 300 is capable of additional functionality as result of having a control module 340 and a SCVPM 350. Control module 340 according to the type of conference session allocates the relevant resources. Exemplary types of conferences include: a conference in which all conferees have a similar layout displayed; a conference in which a different layout is displayed for each conferee; etc. Control module 340 can allocate one SCVPM 350 for each conference session, for example. Control module 340 can determine how many input NPM 352 and output NEM 356 to allocate per each session, make the required connections between the internal modules of the MCU 300, and determine when to change displayed layout configuration, for example, when the currently speaking conferee has changed. More information on control module 340 can be found below in conjunction with FIG. 6.

Session compressed video processing module 350 receives compressed video streams from the plurality of endpoints 230 (See FIG. 2) via NI 320. The compressed video streams are sent toward the MCU 300 via network 210 (See FIG. 2) and processed by network interface 320. Module 350 can create one or more compressed continues presence (CP) video images according to one or more layouts that are associated with one or more conferences currently being conducted by the MCU 300. In one exemplary embodiment, each session compressed video processing module 350 is associated with one conference session. In another exemplary embodiment, each compressed video processing module 350 can handle a plurality of conference sessions in parallel. In yet another embodiment, each SCVPM 350 can comprise: one or more input NAL unit processor module 352 (NPM), one or more output NAL unit editor module 356 (NEM), and one or more compressed video data interface 354. Compressed video data interface 354 transfers the streams of NAL units and ONALs between NPM 352, NEM 356, and NI 320, for example. The compressed video data interface 354 can communicate with NI via a bus, for example.

An input NAL unit processor module 352 (NPM) can receive compressed video from the different endpoints via compressed video data interface 354. The compressed video data can be embedded in NAL units. NPM 352 can arrange and organize the compressed video NAL units into ONALs as shown in FIG. 1b. In one exemplary embodiment, each input NAL unit processor module 352 can be assigned to one specific endpoint 230 (See FIG. 2) in a conference session. In another embodiment, an input NAL unit processor module 352 can be assigned to a plurality of endpoints that are being handled by the conference session. More information on NPM 352 is described below in conjunction with FIGS. 4, 7a, and 7b.

An output NAL unit editor module 356 (NEM) builds the composed layout to be displayed on one or more endpoint's 230 (See FIG. 2) display. Output NAL unit editor module 356 (NEM) can receive streams of ONALS from compressed video data interface 354. The streams can be ONALs arranged by NPM 352 as shown in FIG. 1b, or they can be received NAL units from an endpoint. If the stream is of ONALs, then NEM 356 can compose them into the required layout as shown in FIG. 1c or 1d. If the stream is of the original received NAL units, then NEM 356 can arrange the NAL units into ONALs as shown in FIG. 1b and then compose them into the required layout, as shown in FIG. 1c or 1d. In an alternate embodiment, NEM 356 may arrange the required layout of ONALs simultaneously upon organizing received NAL units into ONALs. NEM 356 can then output the composed compressed layouts toward the NI 320 via compressed video data interface 354.

According to the conference needs each output, NAL unit editor module 356 (NEM) can be associated with one specific endpoint 230 (See FIG. 2), or with a number of endpoints 230 (See FIG. 2). If the conference session needs are such that each endpoint can define different layout parameters from one endpoint to another, then one NAL unit editor module 356 (NEM) can be assigned for each endpoint. Layout parameters can include: bit rate, frame rate, layout settings, maximum layout size, etc. If instead, the conference session is such that all endpoints 230 (See FIG. 2) receive the same layout, then one NAL unit editor module 356 (NEM) can be assigned to one or more endpoints. More information on NEM 356 is described below in conjunction with FIGS. 5 and 8.

The architecture illustrated in FIG. 3 is a centralized architecture. Alternatively, a decentralized architecture can be used. In an exemplary decentralized architecture, NEM 356 can receive the NAL units from the different endpoints, organize them into ONALs, and construct the composed layout to be displayed on the endpoints' displays. In such an embodiment, the session compressed video processing module 350 does not require a NPM 352 to be associated to it. In another exemplary decentralized architecture, the NPM 352 modules can be associated to the endpoints themselves, meaning SCVPM 350 does not require a NPM 352 to be associated to it. In an alternate decentralized architecture embodiment, an NEM 356 can be embedded within an endpoint 230 (See FIG. 2).

Figure 4:
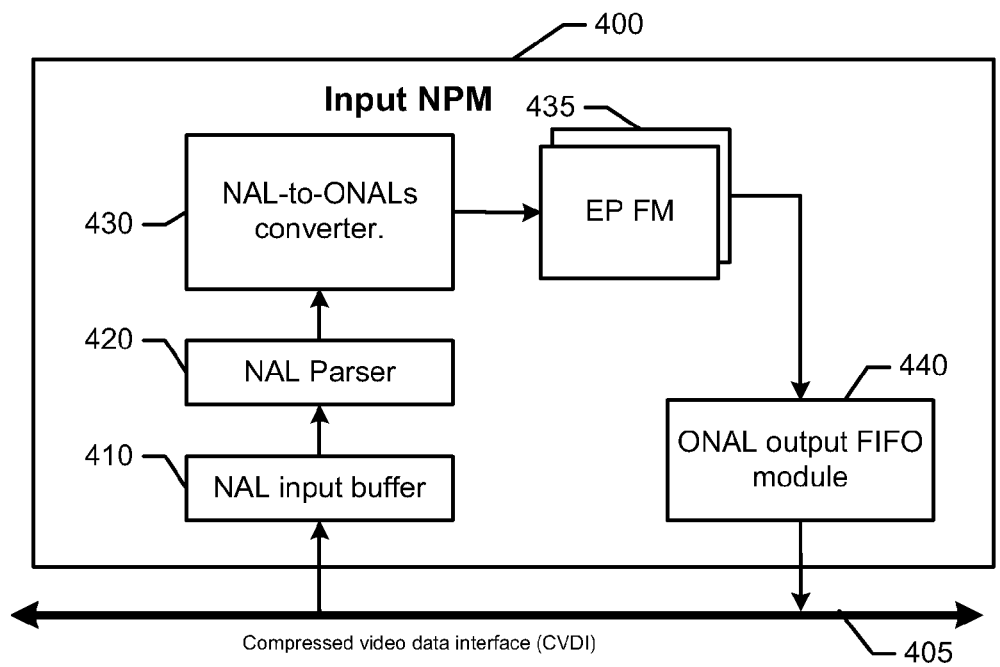
FIG. 4 is a block diagram illustrating the relevant elements of an exemplary input NAL unit processor module 400 (NPM).

FIG. 4 is a block diagram illustrating relevant elements of an exemplary input NAL unit processor module 400. Input NAL unit processor module (NPM) 400 can comprise: a NAL unit input buffer 410; a NAL unit parser module 420; a NAL unit-to-ONALs converter module 430; one or more endpoint frame memory (EP FM) 435; a ONALs output FIFO 440; and a compressed video data interface (CVDI) 405. There can be a number of EPFMs 435 in parallel, one EPFM 435 being built and another EPFM 435 being drained, for example. The exemplary input NAL unit processor module (NPM) 400 can be associated with an EP 230 (See FIG. 2). It can get compressed video streams of NAL units from its associated EP via the compressed video data interface (CVDI) 405 and NI 320 (See FIG. 3). The received compressed NAL units are then buffered in NAL unit input buffer 410.

NAL parser 420 can fetch and parse the compressed video NAL units from NAL unit input buffer 410. NAL unit parser 420 can then identify different NAL unit parameters, such as, but not limited to: the First MB in the NAL unit and the frame number. NAL unit-to-ONALs converter 430 can then fetch the parsed NAL units and the identified parameters from NAL unit parser 420. In one exemplary embodiment, according to the identified parameters, NAL unit-to-ONALs converter module 430 can organize the NAL units into ONALs and store the ONALs into an EP FM 435. NAL unit-to-ONALs converter 430 can also organize the NAL units in such a way that each row of a segment in EP FM 435 starts with a new ONAL, each new ONAL is composed of one NAL unit, and each composed ONAL ends if the end of the row is reached or if a new NAL unit has begun. NAL unit-to-ONALs converter 430 can modify different parameters in the ONALs header in order to comply with the new arrangement. These parameters can include: frame number that is associated with each ONAL and First MB in the ONAL. NAL unit-to-ONALs converter 430 can also modify parameters in the ONALs' compressed video data, such as motion vectors, prediction parameters, etc.

Once an EP FM 435 is completed, it can appear similar to the snapshot illustrated in FIG. 1b, for example. Then, NAL unit-to-ONALs converter module 430 can allocate a new EP FM 435 and start building a new composed frame. ONAL output FIFO ("First in, First out") module 440 can fetch the ONALs from the EP FM 435 and store them in a FIFO stack. Data from ONAL output FIFO module 440 can be transmitted via compressed video data interface 405.

Figure 5:
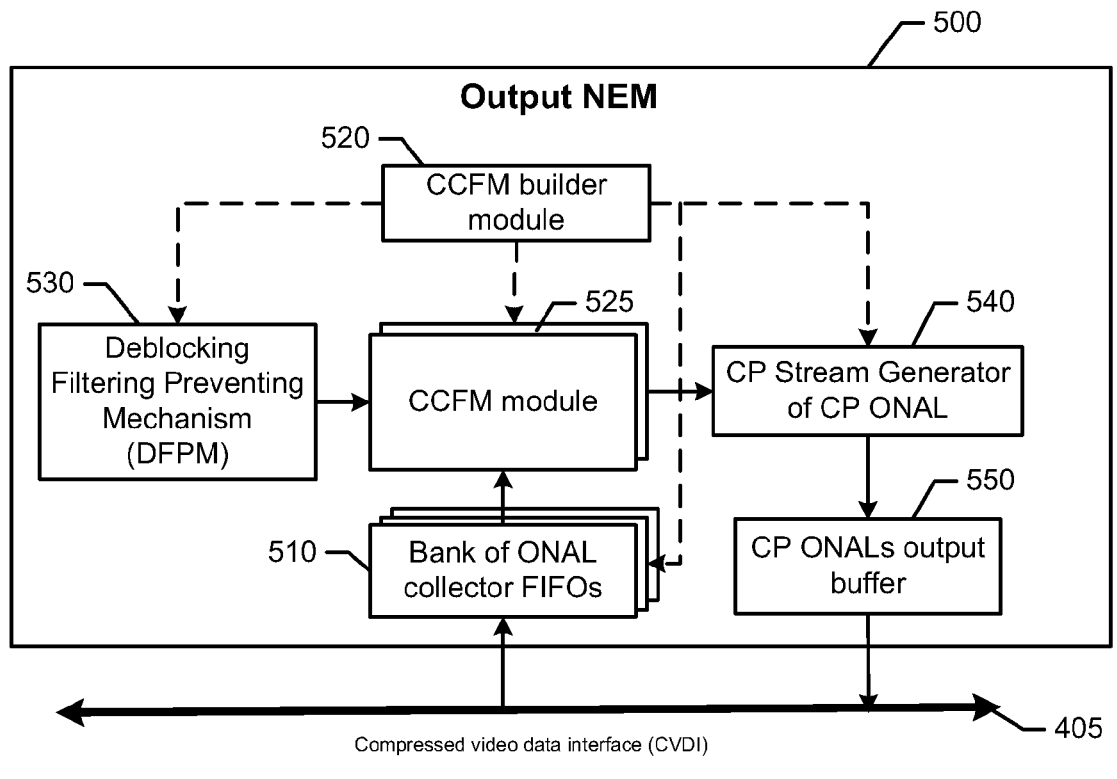
FIG. 5 is a block diagram illustrating relevant elements of an exemplary output NAL unit editor module 500 (NEM).

FIG. 5 is a block diagram illustrating relevant elements of an exemplary output NAL unit editor module 500 (NEM). NEM 500 can be associated with a layout that will be presented on one or more endpoints. An exemplary output NEM 500 can include a bank of ONAL collector FIFOs 510; one or more CCFM 525; a deblocking preventing mechanism 530; a CCFM builder module 520; a CP stream generator of CP ONAL 540; and a CP ONAL output buffer 550. The number of FIFOs in the Bank of ONAL collector FIFOs 510 can vary depending on the number of segments displayed on a layout. For a six conferees conference (i.e., a conference with six endpoints) wherein each conferee is displayed in the layout, for example, there can be six FIFOs. Each FIFO from 510 can get input ONALs from ONAL output FIFO 440 via CVDI 405.

CCFM builder module 520 can manage and control the relevant modules of output NEM module 500. It can also manage one or more CCFMs 525. CCFM builder module 520 can fetch the ONALs from the Bank of ONAL collector FIFOs 510 and place them in the appropriate place in a CCFM. An exemplary CCFM builder module 520 can also place border line ONALs in their relevant places. CCFM builder module 520 can fetch the border line ONALs from DFPM 530. DFPM 530 then can construct border line ONALs. Exemplary border line ONALs can be uniform in color, for example. The color components (Y, Cb, and Cr) of the MBs of the border line can be configured such that a receiving decoder will not activate the deblocking filter over the edges of the MB. An exemplary method for calculating those color values is disclosed above. Border line ONALs can be located between ONAL segments, in a width of one or more MBs. Other exemplary embodiments may use other types of DFPM as disclosed above.

CCFM builder module 520 may modify the First MB in the ONAL and the frame number in the ONAL header, for example. The modifications in the header and the payload are done in order to comply with the new arrangement. When CCFM builder module 520 finishes processing a layout, the CCFM 525 may look similar to the snapshot illustrated in FIG. 1d, for example.

Data from CCFM module 525 can be transmitted to CP stream generator of CP ONAL 540 upon completion of a CCFM or upon completion of each row. In an exemplary embodiment, one CCFM 525 can be constructed, while another CCFM 525 is full and waiting to be transmitted. CP stream generator of CP ONAL 540 can then transfer the ONALs of the composed image to CVDI 405 via CP ONALs output buffer 550.

Figure 6:
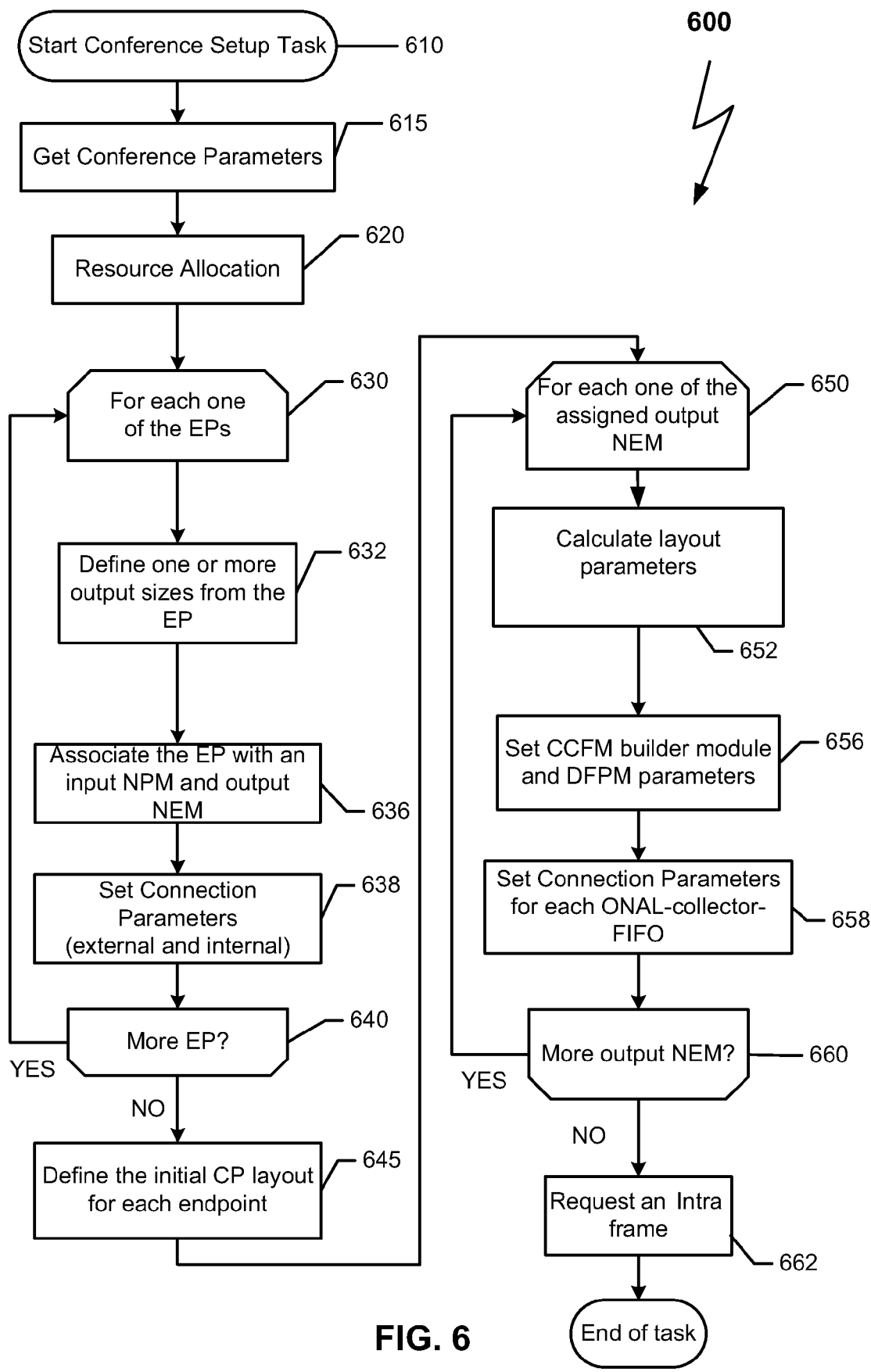
FIG. 6 is a flowchart illustrating relevant preparation steps for establishing a conference call.

FIG. 6 is a flowchart illustrating an exemplary method 600. Method 600 can be executed by an exemplary control module 340 (See FIG. 3). An Exemplary method 600 may be initiated 610 by Control module 340 (See FIG. 3) upon establishing a conference session. During initiation 615, conference parameters such as, but not limited to: number of endpoints; frame rate; layout, etc., are gathered. Next, the relevant resources are allocated 620. Allocated resources can include: NI 320 (See FIG. 3) and SCVPM 350 (See FIG. 3), etc.

Next, a loop between steps 630 and 640 is initiated for each endpoint 230 (See FIG. 2) in the conference. First, the size of the segment in which the image from the endpoint 230 will be displayed is defined 632. The size can be defined by the number of pixels in each direction (W×H). Then, an NPM 352 and an NEM 356 (See FIG. 3) are associated 636 to the endpoint. Exemplary associations include: defining whether and how to fetch or transfer the data from or through CVDI 354 (See FIG. 3). At step 638, connection parameters (internal and external) are set for connections between, for example, a NEM 356 and a NPM 352, as well as between the MCU and the endpoint. At step 640, method 600 determines whether there are more endpoints 230 (See FIG. 2) participating in the session. If there are more EP participating, then method 600 returns to step 630 to handle the next endpoint. If there are no more EP participating, then method 600 proceeds to step 645.

At step 645, a second loop is initiated for defining a CP layout. A loop between step 650 and 660 is initiated for each assigned output NEM 356 (See FIG. 3). Layout parameters are calculated 652 according to a picture parameter set, for example, and a mapping of CCFM 525 (See FIG. 5) is constructed. One exemplary layout is illustrated in FIG. 1*d*. Exemplary calculated parameters can include: location of the top left MB (MB address) of each segment; number of MB for each segment; and the mapping of the border line. Next, CCFM module 525 (See FIG. 5) and DFPM 530 (See FIG. 5) module parameters can be set 656. DFPM 530 parameters can be border line ONAL color and length, for example. Method 600 then sets 658 connection parameters for each ONAL-collector-FIFO 510 (See FIG. 5). Next, a decision 660 is made, as to whether more assigned output NEM modules still need to be configured. If decision 660 results in a yes, then method 600 returns to step 650. If not, then method 600 proceeds to step 662.

At step 662, method 600 requests an Intra frame, and method 600 ends. A similar method as method 600 can be executed when a layout needs to be changed. For example, the layout can be required to change when a new endpoint has joined, a speaker has changed, or a conferee has left the conference.

Figure 7A:
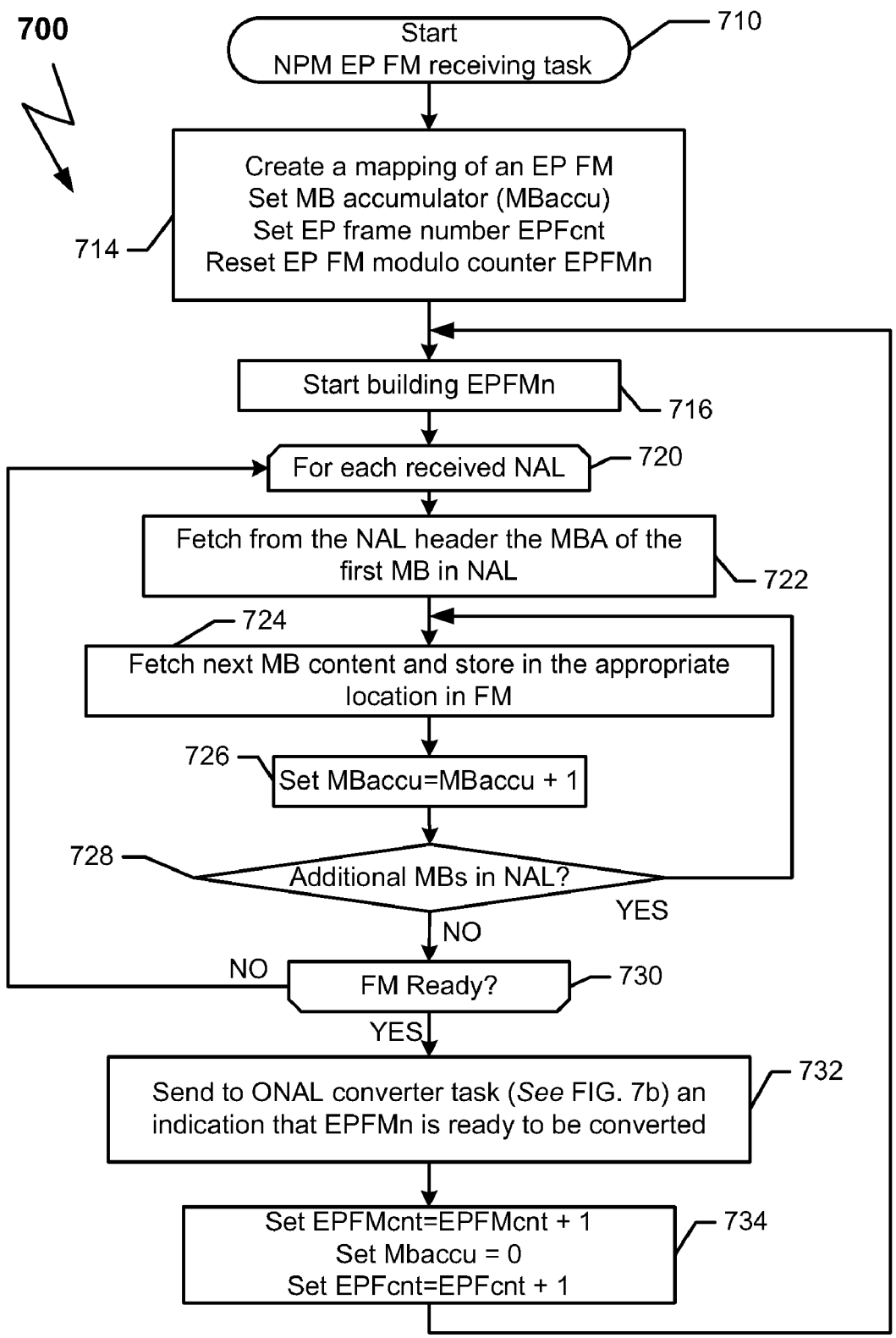
FIGS. 7a and 7b are flowcharts illustrating relevant steps of a NAL unit processor module.

FIG. 7*a* illustrates a flowchart with relevant steps of an exemplary method 700. Method 700 can be executed by a NAL unit parser 420 (See FIG. 4), for example. Method 700 may be initiated 710 by a control module 340 (See FIG. 3) for parsing received NAL units and storing them in an EP FM, similar to the one that is illustrated at FIG. 1*a*. During initiation 714, the relevant resources are allocated and reset. Allocated resources may include: an MB accumulator (MBaccu); an EP frame number counter (EPFcnt); or an EP FM modulo counter (EPFMn). In addition, method 700 may start mapping an exemplary EP FM. Exemplary mapping can be organized by rows of MBs, i.e., for each row, the first MB of the row is written and the size in MBs of the row is determined and the written in the mapping. For example, if method 700 was used to map the FM illustrated in FIG. 1*b*, it would determine that the number of the first MB in the first row was MB #0 and the fact that the size/length of the row, for example, was 13 MB; it would then determine that the number of the first MB in the second row was MB #13 and the fact that the size/length of the row was 13 MB. Next, the third row mapping is determined and designated, and so on. The above information can be collected from a parameter set sent with each Intra frame, for example.

At step 716, method 700 can start building an EPFMn. There can be a number of EPFMs in parallel, one EPFM being built and another EPFM being transmitted, for example. A loop between steps 720 and 730 is then initiated, with one cycle of the loop being performed for each received NAL unit. In an exemplary embodiment, the NAL units can be received 720 from the Network Interface NI 320 (See FIG. 3). NI 320 can be capable of organizing and transferring the NAL units. Organizing the NAL unit can be based on identifying the start of NAL unit indication (SONI). An exemplary SONI can be a string of 32 bits in which the first 31 are zeros and the last one has a value of one, or "TRUE." Then, the NAL units are organized according to their frame number and first MB in the NAL unit. NI 320 can also be capable of overcoming sequence problems due to, for example, different receiving time or missing packets. An exemplary NI may respond to missing packets by requesting an Intra frame. Each address of a frame memory can include a field dedicated to reflect the frame number and the first MB in the NAL unit. The field can be used for determining which MB is the beginning and which MB is the end of each received NAL unit.

At step 722, an internal loop between steps 722 and 728 is started. Method 700 fetches 722 a few parameters such as: the frame number, the first MB in the NAL unit, etc., from the received NAL unit header. Based on the MBaccu and the information of the mapping, method 700 then fetches 724 the next MB content and stores it 724 in the appropriate location in the FM. An indication pointing the frame number is stored 724 as well. Next, MBaccu is incremented 726 by one. At step 728, a decision is made as to whether there are additional MBs in the NAL unit. The decision can be based on identifying the Start of NAL unit indication (a string of 32 bits at the beginning of each NAL unit). If, at step 728, it is determined that there are additional MBs in the NAL unit, then method 700 returns to step 724. If not (i.e., if the SONI for the next NAL unit was found), then method 700 proceeds to step 730.

At step 730, a decision is made as to whether the FM is ready for conversion. The decision can be made by comparing the value of MBaccu to the number of MBs in the FM. If the FM is not ready, then method 700 returns to step 720 for handling the next received NAL unit. If the FM is ready, then method 700 sends an indication 732 to NAL unit-to-ONAL converter 430 (See FIG. 4) that the EPFMn is ready to be converted into an EPFM of ONALs similar to the snapshot illustrated in FIG. 1*b*, for example. Next, method 700 increments the EPFMn number counter by one, sets the MBaccu to zero, and increments the EPFcnt by one 734. Finally, method 700 returns to step 716.

Figure 7B:
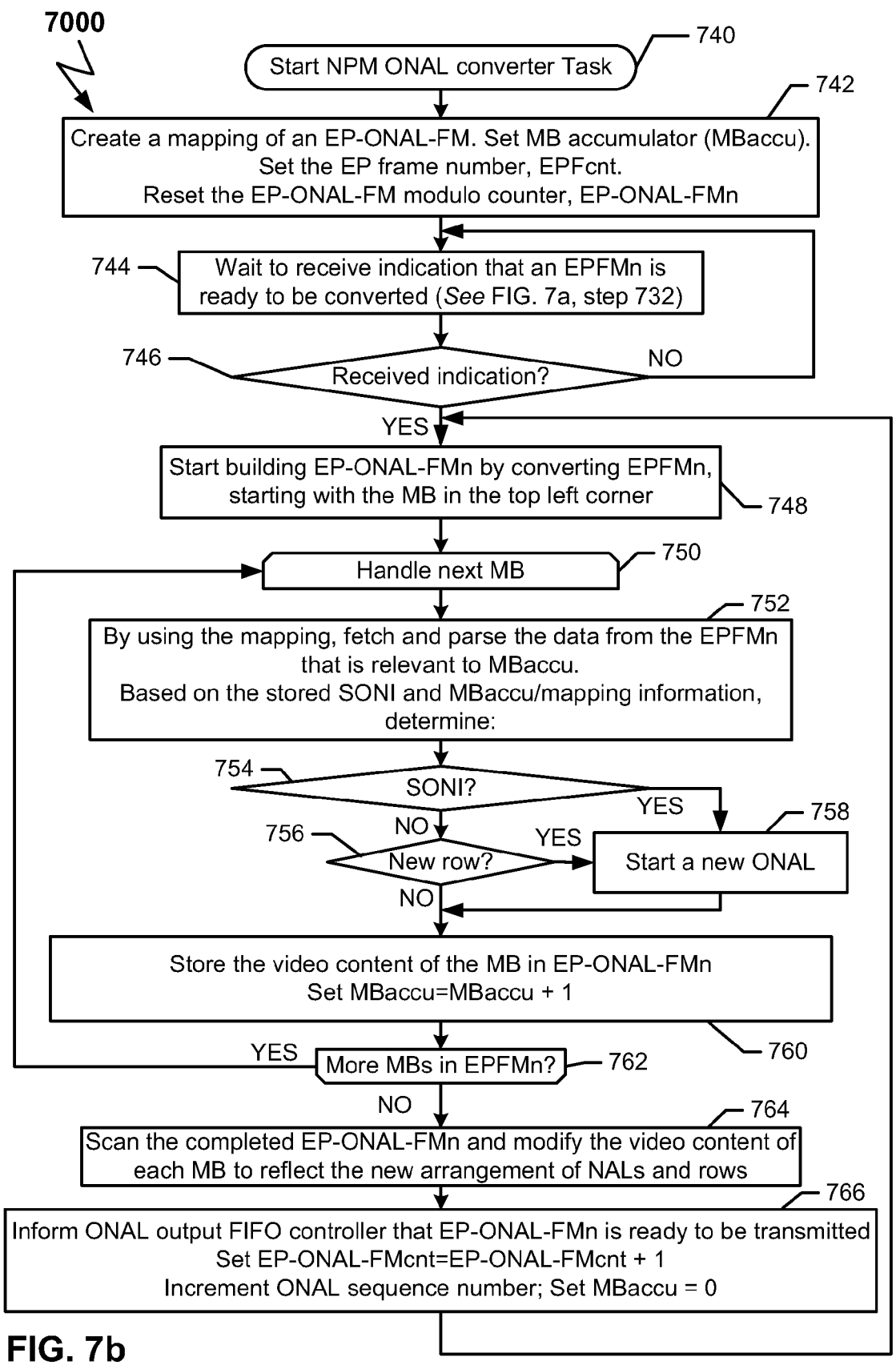

FIG. 7*b* illustrates an ONAL converter method 7000. Method 7000 can be executed by NAL unit-to-ONAL converter module 430 (See FIG. 4) in an NPM module 352 (FIG. 3), for example. At step 742, a mapping of an EP-ONAL-FM is created 742. The EP-ONAL-FM mapping process can be similar to the mapping process described above in reference to FIG. 7*a*. Relevant resources, such as, but not limited to: a second MB accumulator (MBaccu2); a second EP frame number (EPFcnt2); or a second EP-ONAL-FM modulo counter (EPFMn2) can be allocated and then set 742. Next, method 7000 waits for an indication that an EPFMn is ready to be converted (See FIG. 7*a*, step 732) 744. If, at step 746, an indication is received, then method 7000 proceeds to step 748. If not, method 7000 returns to step 744 and continues waiting for an indication that an EPFMn is ready to be converted.

At step 748, the building of an EP-ONAL-FMn is begun. The ready EPFMn's from step 732 of FIG. 7*a* can be converted at step 748 to an EP-ONAL-FMn, starting at the top left corner. A loop consisting of steps 750 through 762 is then started and executed for each MB in the EPFMn. Method 7000 fetches 752 and parses 752 the data from the EPFMn's relevant toMBaccu2. Based on the start of NAL unit indication (SONI), method 7000 determines, at step 752, whether the beginning of a new NAL unit—and consequently the end of previous NAL unit—was reached. An exemplary SONI can be a string of 32 bits, in which the first 31 are zero and the last one has a value of one, or "TRUE." If, at step 754, the method 7000 is at the beginning of a new received NAL unit, then a SONI is written in the appropriate field in the EP-ONAL-FM (i.e., a new ONAL is initiated) 758 and method 7000 proceeds to step 760. If, at step 754, the MB is not the end of the received NAL unit, then a decision is made 756, whether it is at the beginning of a new row of MBs. If it is at a new row 756, then method 7000 writes the SONI 758 and proceeds to step 760. If method 7000 is not at a new row 756, then method 7000 proceeds to step 760.

At step 760, the video content of the MB is stored in the EP-ONAL-FMn, and MBaccu is incremented 760 by one. At step 762, a decision is made based on the value of the MBaccu as to whether more MBs need handling in the EPFMn. If more MBs need handling, then method 7000 returns to step 750. If not, then method 7000 proceeds to step 764.

At step 764, method 7000 scans 764 the completed EP-ONAL-FMn. Method 7000 then modifies the video content of each MB to reflect the new arrangement of NAL units and rows 764. The modification can adapt the MV prediction to compensate for the data in new rows and/or new ONALs in order to preserve the value of the absolute MV. Next, ONAL output FIFO 440 (See FIG. 4) is informed that it can start transmitting the EP-ONAL-FMn and that EP-ONAL-FMcnt can be increased by one 766. ONAL sequence number is then incremented 766 and Mbaccu value is set to zero 766. Next, method 7000 returns to step 748.

Figure 8:
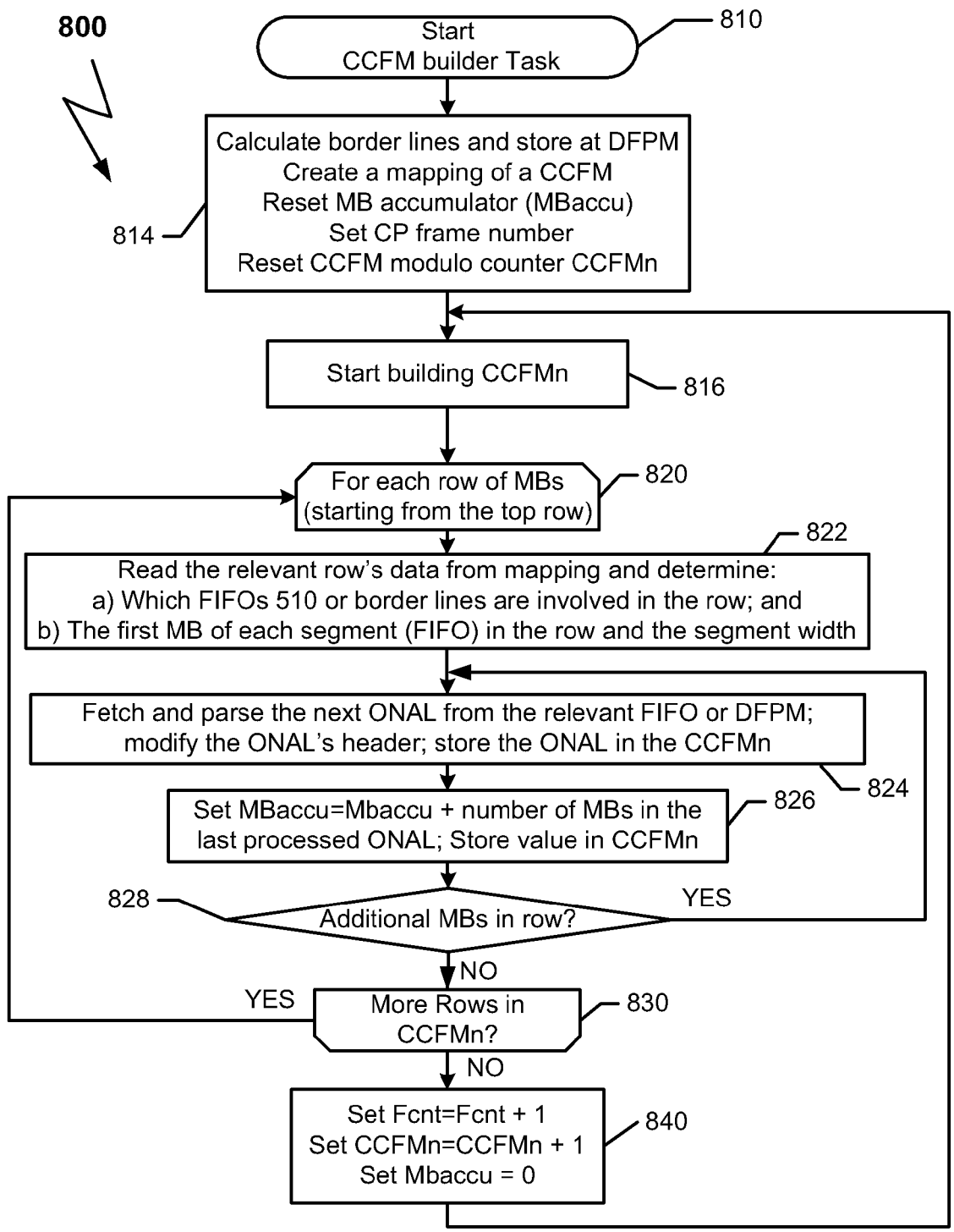
FIG. 8 is a flowchart illustrating relevant steps for building a CCFM.

FIG. 8 is a flowchart illustrating relevant processes of an exemplary method 800. Method 800 can be executed by an exemplary CCFM builder module 520 (See FIG. 5) while building a CCFM. Method 800 may be initiated 810 by CCFM builder module 520 (See FIG. 5) for mapping and assembling a CCFM similar to the snapshot shown in FIG. 1c or FIG. 1d. An exemplary CCFM mapping can be organized by rows of MBs. For each row, the first MB of a segment or of a border line (and the width of the segment or border line) is determined and written in the mapping. An exemplary mapping and marking procedure, as illustrated in FIG. 1d, may include, for example: designating the first MB in the first row (MB #'0') for segment 'a' (the length of segment 'a' can be 13 MB, for example); designating MB #13 of the first row as being part of a border line (the length of the border line segment can be 1 MB, for example); designating MB #14 in the first row of the CCFM for segment 'b' (the length of segment 'b' can be 6 MB, for example). Next, the second row mapping is determined and designated, then the third row, and so until all rows are completed. In yet another embodiment, DFPM 530 (See FIG. 5) can map and designate the border lines as described in method 600, step 656.

During initiation step 814, the relevant resources such as, but not limited to, an MB accumulator (MBaccu), a CP frame number counter, and a CCFM modulo counter (CCFM) are allocated and reset. Next, method 800 proceeds to step 816 and starts building a CCFM 525 (See FIG. 5). A number of CCFM can be processed in parallel, for example, one CCFMn can be built while another is being transmitted. A loop between step 820 and 830 is initiated, one cycle for each row of MBs in the CCFMn.

In one embodiment, the first row to be mapped 820 and designated is the first row of the CCFM. At step 822, method 800 determines—based on the mapping of each row—which FIFO 510 (See FIG. 5) and/or border line DFPM 530 (See FIG. 5) are involved in the row, then determines the first MB of each segment in the row, and the segments length in MB. Next, an internal loop is initiated, consisting of steps 824 through step 828. Based on the MBaccu and the layout mapping, method 800 fetches an ONAL from the relevant FIFO 510 (See FIG. 5) or fetches a border line ONAL from DFPM 530 (See FIG. 5); determines the number of MBs carried in the ONAL; modifies the ONAL header as disclosed above (adapting the first MBA to its location in the composed frame, for example); and stores 824 the modified ONALs in the relevant location in the CCFMn.

Next, the MBacuu value is increased by the number of carried MBs in the last processed ONAL and stored 826 in the CCFMn. At step 828, a decision is made as to whether additional MBs are needed to be placed in the row. If additional MBs are needed, then method 800 returns to step 824. If not, then method 800 proceeds to step 830. At step 830, a decision is made as to whether more rows in the CCFMn need to be filled with the relevant MBs' data. If more rows still need to be filled, then method 800 returns to step 820. If not, then method 800 proceeds to step 840.

At step 840, a "Ready" indication of CCFMn can be set for indicating that CCFM can be transmitted, and the frame count (Fcnt) value can be increased by one. The CCFMn value is then incremented by one at step 840, indicating the next CCFM to be used for building the next composed frame. The MBaccu is then reset to zero 840. Finally, method 800 returns to step 816 in order to build the next CCFM.

In this application, the words "unit" and "module" are used interchangeably. Anything designated as a unit or module may be a stand-alone unit or a specialized module. A unit or a module may be modular or have modular aspects, allowing it to be easily removed and replaced with another similar unit or module. Each unit or module may be any one of, or any combination of: software, hardware, and/or firmware. Software of a logical module can be embodied on a computer readable medium such as, but not limited to: a read/write hard disc, CDROM, Flash memory, ROM, etc. In order to execute a certain task, a software program can be downloaded and/or executed on an appropriate processor as needed.

The present invention has been described using detailed descriptions of embodiments thereof that are provided by way of example only and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described—and embodiments of the present invention comprising different combinations of features noted in the described embodiments—will be readily apparent to those skilled in the art.

What is claimed is:

1. An apparatus for creating a composed video image from video image data representing two or more video images, comprising:
   a compressed video data interface; and
   a processor that:
   retrieves compressed video image data for the two or more video images from the compressed video data interface, wherein the compressed video image data for each image comprises organized network abstraction layer (ONAL) units, each ONAL unit originating from only one network abstraction layer (NAL) unit and originating from only one row of macroblocks (MBs) within a frame of the compressed video image data of its video image;
   converts the ONAL units of each of the video images onto ONAL units to be stored in a frame memory of composed video image data, wherein each one of the ONAL units of the composed video image data is originated from one ONAL unit within the retrieved compressed video image data; and
   transmits the composed frame memory of the composed video image data to the compressed video data interface.

2. The apparatus of claim 1, wherein the processor is further programmed to modify the frame memory for the composed video image data to prevent deblocking filtering of the composed video image data.

3. The apparatus of claim 2, wherein the modifying adds one or more border lines to the composed video image.

4. The apparatus of claim 1, wherein the composed video image data is compressed according to the H.264 standard.

5. The apparatus of claim 1, wherein the apparatus is embedded within an multipoint control unit.

6. A multipoint control unit (MCU) for composing a composed video image from video image data from two or more endpoints in a video conference, comprising:
 a network interface for receiving and sending video image data between the MCU and the two or more endpoints;
 a compressed video data interface;
 a data bus for communicating video image data between the network interface and the compressed video data interface; and
 a processor that:
  retrieves, from the compressed video data interface, compressed video image data originating from the two or more endpoints, wherein the compressed video image data of each of the endpoints comprises organized network abstraction layer (ONAL) units, each ONAL unit originating from only one network abstraction layer (NAL) unit and originating from only one row of macroblocks (MBs) within a frame of the compressed video image data from its endpoint;
  maps a composed frame memory for storing the ONAL units of each of the video images and converts the ONAL units of each of the video images onto ONAL units of the composed frame memory storing the composed video image data, wherein the ONAL units of the composed video image data originate from only one ONAL unit of one of the video images;
  composes the frame memory for the composed video image data according to the map;
  transmits the composed frame memory of the composed video image data to the compressed video data interface; and
  send the composed video image data to at least one of the two or more endpoints via the network interface.

7. The apparatus of claim 6, wherein the processor is further programmed to modify the frame memory for the composed video image data to prevent deblocking filtering of the composed video image data.

8. The apparatus of claim 7, wherein the modifying adds one or more border lines to the composed video image.

9. The apparatus of claim 6, wherein the composed video image data is compressed according to the H.264 standard.

10. The apparatus of claim 6, wherein the processor is further programed to:
 retrieve, from the compressed video data interface, NAL-formatted compressed video image data from the two or more endpoints, wherein the video image data comprises NAL units;
 convert the NAL units of the NAL-formatted compressed video image data units into ONAL units; and
 transmit the ONAL units to the compressed video data interface.

11. The apparatus of claim 10, wherein converting the NAL units to ONAL units comprises modifying a portion of the compressed video data.

12. The apparatus of claim 11, wherein the modified portion of the compressed video data is representative of motion information.

13. A method for composing a videoconferencing layout, the method comprising:
 receiving a compressed video input stream from each of two or more endpoints, wherein each of the compressed video input streams complies with the H.264 standard and is organized into NAL units;
 converting each video input stream of NAL units into a stream of organized NAL (ONAL) units, wherein each ONAL unit comprises compressed video data that originated from only one NAL unit and only one row of the compressed video input stream;
 storing each stream of organized NAL units in a compressed composed frame memory, wherein information stored in each ONAL unit reflects the location of the ONAL unit's compressed video data in the desired composed videoconferencing layout;
 manipulating each of the stored ONAL units in the compressed composed frame memory to reflect each ONAL unit's location in the desired composed videoconferencing layout; and
 transmitting the manipulated ONAL units as a compressed output stream reflecting the desired composed videoconferencing layout.

14. The method of claim 13, wherein storing each stream of ONAL units in a compressed composed frame memory further comprises modifying the frame memory for the composed video image data to prevent deblocking filtering of the composed video image data.

15. The method of claim 14, wherein the modifying comprises adding one or more border lines to the composed videoconferencing layout.

16. The method of claim 13, wherein converting each received video input stream of NAL units into a stream of ONAL units further comprises modifying a portion of the compressed video data.

17. The method of claim 16, wherein the modified portion of the compressed video data is relevant to motion information.

* * * * *